Patented May 4, 1937

2,079,383

UNITED STATES PATENT OFFICE 2,079,383

MANUFACTURE OF PHENOLS

Curt Raeth, Karl Willy Rittler, Radebeul, near Dresden, and Friedrich Arnold Steingroever, Dresden, Germany, assignors to Chemische Fabrik von Heyden, A. G., Radebeul, near Dresden, Germany, a corporation of Germany No Drawing. Application September 19, 1935, Serial No. 41,272. In Germany August 24, 1931

6 Claims. (Cl. 260—154)

Our invention relates to improvements in the manufacture of phenols from the corresponding halogen substituted aromatic hydrocarbons by hydrolysis, and it further relates to the proportion of alkali metal carbonate and halogen benzene which is used.

It has long been known that halogenated benzene hydrocarbons can be hydrolyzed by caustic soda in an aqueous solution at an elevated temperature and pressure in a practicable process. In such procedure a step of acidification is required in order to produce phenol from the phenate which is the product of the reaction.

Further a process is known which produces phenol directly and at the same time with good yields; in this process a halogenated benzene is heated under pressure with water and a salt of a strong base and a weak acid in the presence of an agent facilitating the reaction, like copper, which may be employed as strips, cuttings etc. or as lining surfaces in the reaction vessel or tube. In the United States Patents 1,882,824, 1,882,826, and 1,925,321 covering this procedure the process is illustrated by the following equation:

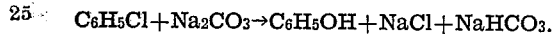

$C_6H_5Cl + Na_2CO_3 \rightarrow C_6H_5OH + NaCl + NaHCO_3$.

The basic salt is transformed to acid salt from which the former is regenerated by adding alkali. The alkali metal chloride concentration of the aqueous solution will increase with continued operation and it becomes necessary to remove the excess of alkali metal halide by the ordinary evaporation methods.

Now we have found that it is possible and practicable to hydrolyze the halogen benzene by dilute aqueous solutions of alkali metal carbonates at a temperature between 320 and 400° and at an elevated pressure, the proportion of the alkali metal carbonate being less than equimolecular. The following equation may illustrate the process described

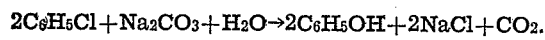

$2C_6H_5Cl + Na_2CO_3 + H_2O \rightarrow 2C_6H_5OH + 2NaCl + CO_2$.

We have further found that it is possible and practicable to hydrolyze the chlorobenzene with half a mol. of alkali carbonate or less than half a mol. whereby good yields of phenol are obtained and the alkali is nearly completely transformed to alkali metal chloride. Instead of employing an alkali metal carbonate alone we may also operate with a mixture of alkali metal carbonate and caustic alkali, the sum total of alkali being equivalent or less than equivalent to the halogen benzene. The caustic alkali may be replaced by an equivalent quantity of an oxide or a hydroxide of an earth-alkali-metal like calcium- or barium-hydroxide.

By our improved process it is possible to hydrolyze double the quantity of halogen benzene than can be hydrolyzed in the same apparatus and within the same period of operation by the processes of any previously published patents, and at the same time to simplify the working down of the products of the reaction and the regeneration of the alkali metal chloride. The use of alkali metal carbonate or of the mixture of alkali metal carbonate and caustic alkali in a proportion equivalent or less than equivalent to the halogen benzene employed also produces phenol directly without acidification. Furthermore the danger of destruction of the apparatus is reduced, and less tar or other by-products of reaction are formed.

The process may be carried out in any apparatus known in the art as practicable for working at elevated temperatures and pressures, for example in an autoclave or in a tubular system.

While in the foregoing specific description reference has been made to the production of phenol ($C_6H_5OH$) it will be understood that the principle of the invention is generally applicable to the preparation of other phenols by reaction of a halogenated aromatic hydrocarbon and an alkali metal carbonate or a mixture of alkali metal carbonate and caustic alkali as herein described. Cresols, xylenols, naphtols, or substituted phenols may be made in the same manner. Other modes of applying the principle of our invention may be employed instead of the one explained, change being made as regards the method herein disclosed, provided the step or steps stated by any of the following claims or the equivalent of such stated step or steps be employed. The chlorinated aromatic hydrocarbons may be replaced by brominated aromatic hydrocarbons.

Example 1

1 mol. chlorobenzene and 0.6 mol. of sodium carbonate in an aqueous solution are heated under pressure at 350° C. in the presence of pulverulent copper, the pressure being about 4500 pounds per square inch. After the mixture has been heated for an hour, it is drawn off, the oily layer is separated and the aqueous layer is treated with an extracting medium. The extract is added to the oily layer and fractionated by distillation. The aqueous layer, after being extracted, is concentrated whereupon sodium chloride formed by the reaction separates out. Hydroxy carbonic acids obtained as by-products may be isolated by acidulating the mother liquor. The yield in phenol is more than 60 per cent besides about 23 per cent of diphenyloxide.

*Example 2*

1 mol. 2-chloronaphthalene is heated with a 10 per cent aqueous solution of 0.6 mol. sodium carbonate to about 350° C. under pressure as described in Example 1. β-naphtol is obtained, the yield being about 75 per cent. Dinaphthyloxide and 2,3-hydroxynaphthoic acid may be isolated besides, the latter being precipitated from the aqueous solution.

*Example 3*

1 mol. chlorobenzene is heated in an aqueous solution of 0.3 mol. sodium carbonate and 0.3 mol. sodium hydroxide to about 350–370° C. in the presence of copper and under elevated pressure. 90 percent of the chlorobenzene hydrolyzed to phenol, hydroxy benzene carbonic acids and a small quantity of diphenyloxide. 95 percent of the alkali present is transformed into sodium chloride.

In the foregoing example sodium hydroxide may be replaced by an earth alkali metal hydroxide like calcium hydroxide.

*Example 4*

By heating 1 mol. chlorobenzene with an aqueous solution of 0.3 mol. sodium carbonate and 0.15 mol. sodium-hydroxide, phenol and its by-products are obtained in a very good yield and the alkali is transformed entirely into sodium chloride.

What we claim is:

1. Improvement in the manufacture of free phenols by hydrolyzing aromatic hydrocarbons halogenated in the nucleus which comprises heating to about 320–400° under pressure such halogenated aromatic hydrocarbon with an aqueous solution of an alkali metal carbonate, the proportion of halogenated aromatic hydrocarbon and alkali being one mol. halogenated aromatic hydrocarbon to about one atom of alkali metal contained in the alkali metal carbonate, a part of which is replaced by an equivalent quantity of alkali hydroxide.

2. Improvement in the manufacture of free phenols by hydrolyzing aromatic hydrocarbons halogenated in the nucleus, which comprises heating to about 320–400° under pressure such halogenated aromatic hydrocarbon with an aqueous solution of an alkali metal carbonate, the proportion of halogenated aromatic hydrocarbon and alkali being one mol. halogenated aromatic hydrocarbon to about one atom of alkali metal contained in the alkali metal carbonate, a part of which is replaced by an equivalent quantity of an earth alkali hydroxide.

3. Improvement in the manufacture of free phenol by hydrolyzing chlorobenzene, which comprises heating to about 320–400° under pressure chlorobenzene with an aqueous solution of an alkali metal carbonate, the proportion of chlorobenzene and alkali being about one mol. chlorobenzene to one atom of alkali metal contained in the alkali metal carbonate, a part of which is replaced by an equivalent quantity of an alkali hydroxide.

4. Improvement in the manufacture of free phenol by hydrolyzing chlorobenzene, which comprises heating to about 320–400° under pressure chlorobenzene with an aqueous solution of an alkali metal carbonate, the proportion of chlorobenzene and alkali being about one mol. chlorobenzene to one atom of alkali metal contained in the alkali metal carbonate, a part of which is replaced by an equivalent quantity of an earth alkali hydroxide.

5. Improvement in the manufacture of free naphtol by hydrolyzing monochloronaphthalene, which comprises heating to about 320–400° under pressure monochloronaphthalene with an aqueous solution of an alkali metal carbonate, the proportion of monochloronaphthalene and alkali being about one mol. monochloronaphthalene to one atom of alkali metal contained in the alkali metal carbonate, a part of which is replaced by an equivalent quantity of alkali hydroxide.

6. Improvement in the manufacture of free naphtol by hydrolyzing monochloronaphthalene which comprises heating to about 320–400° under pressure monochloronaphthalene with an aqueous solution of an alkali metal carbonate, the proportion of monochloronaphthalene and alkali being about one mol. monochloronaphthalene to one atom of alkali metal contained in the alkali metal carbonate, a part of which is replaced by an equivalent quantity of an earth alkali hydroxide.

CURT RAETH.
KARL WILLY RITTLER.
FRIEDRICH ARNOLD STEINGROEVER.